Figure 1:
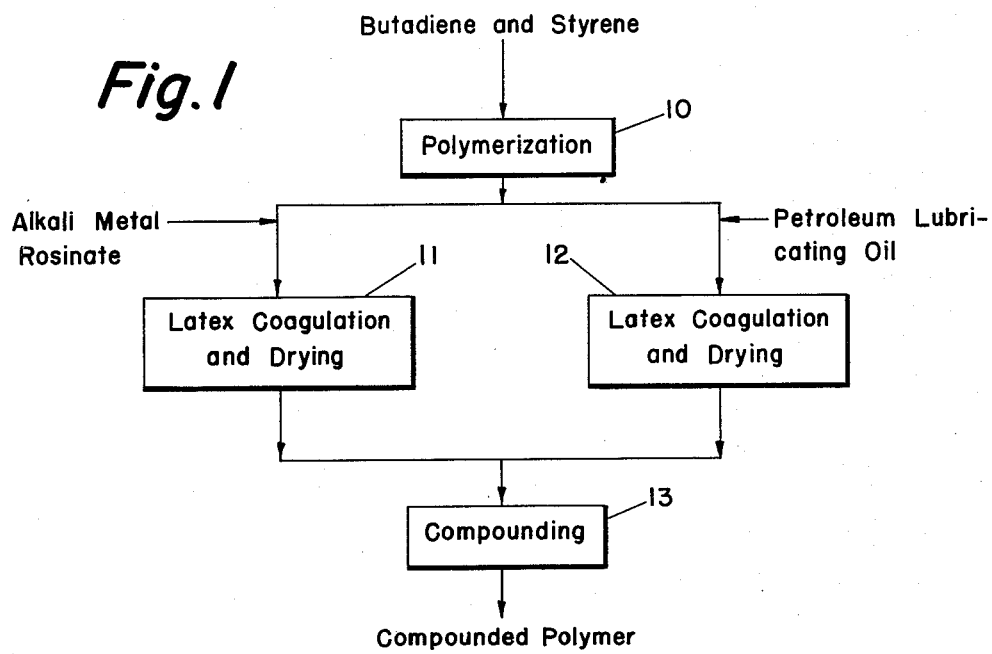

2,993,874
RUBBER-LIKE COMPOSITIONS OBTAINED BY EXTENDING HIGH VISCOSITY BUTADIENE POLYMERS
Archie B. Hoel, Drexel Hill, Pa., assignor to Sun Oil Company, Philadelphia, Pa., a corporation of New Jersey
Filed June 17, 1955, Ser. No. 516,251
12 Claims. (Cl. 260—27)

This invention relates to rubber-like compositions obtained by extending high viscosity butadiene polymers.

It is known in the art to prepare oil-extended synthetic rubbers by polymerizing butadiene, e.g. by interpolymerizing butadiene and styrene, to obtain a polymer having high molecular weight, as indicated by a Mooney viscosity of at least 110, and blending the polymer with sufficient mineral oil to obtain a compounded polymer having Mooney viscosity within the range from 40 to 80. In this manner, rubber compositions having quite high oil contents can be obtained which have properties generally as good as rubber compositions having lower oil contents prepared from polymers having lower viscosities. It is also known in the art to prepare rosin-extended synthetic rubbers in a generally similar manner employing rosin instead of oil as the extender.

Rosin-extended polymers have certain advantageous properties such as hardness, abrasion resistance, crack growth resistance, and high tensile strength; on the other hand they have certain disadvantageous properties such as poor low temperature properties. They are further subject to the disadvantages that they are slow curing and that they are difficult to process because of their highly tacky nature. According to the present invention, the disadvantages of the rosin-extended polymers can be overcome and the advantages in large measure retained by incorporating both petroleum oil and rosin or a rosin derivative in a high molecular weight polymer composition, the ratio of the rosin material to oil in the composition being within the approximate range from 40 to 100 parts by weight of rosin material per 100 parts by weight of oil, and preferably 50 to 80 parts of rosin derivative per 100 parts of oil. The amount of rosin material should be at least 40 parts per 100 of oil in order to secure improved hardness, abrasion resistance, and tensile strength; on the other hand, the amount of rosin material should be not greater than 100 parts per 100 of oil since otherwise difficulties in processing and poor low temperature properties are encountered.

Rosin derivatives as contemplated here include materials derived therefrom which are known for use in rubber compositions, e.g. wood rosin, gum rosin, disproportionated rosin, abietic acid, dehydroabietic acid, tetrahydroabietic acid, rosin dimer, glycerol rosinate, etc.

According to the present invention, butadiene is polymerized, in the presence or absence of other polymerizable monomers, such as styrene, methyl methacrylate, 3,4-dichlor-alpha-methylstyrene, methyl isopropenyl ketone, acrylonitrile, vinyl chloride, acrylic acid, acrolein, vinyl ethyl ether, vinyl acetylene, vinylidene chloride, butylene, etc.; the polymer obtained is then admixed with petroleum oil; rosin material may be employed during the polymerization or added thereafter or both.

The sum of the amounts of rosin derivative and oil incorporated in the compositions according to the invention depends on the desired compounded Mooney viscosity of the composition as compared with the Mooney viscosity of the raw polymer, and may be determined by a person skilled in the art in the light of the present specification. Generally, it is preferred that such sum be within the approximate range from 20 to 120 parts by weight per 100 parts by weight of polymer, and more preferably within the approximate range from 25 to 75 parts per 100 parts of polymers.

The extended polymers according to the invention, which for convenience will be referred to as oil-rosin extented polymers, have advantages over both oil-extended polymers and rosin-extended polymers. The tensile strength and abrasion resistance of the oil-rosin extended polymers are improved over the corresponding properties of the oil-extended polymers, while the low temperature properties of the oil-rosin extended polymers are not only improved over the corresponding properties of the rosin-extended polymers, but are approximately as good as those of the oil-extended polymers, in spite of the fact that the low temperature properties of the rosin-extended polymers are generally inferior to those properties in the oil-extended polymers.

The extended polymers according to the invention are useful in a variety of applications. They are particularly useful in tire tread formulations, and in tire carcass formulations to obtain good tack; the processing characteristics of the polymer are good, and good adhesion of the plies and splices is obtained with the polymer.

Figure 2:
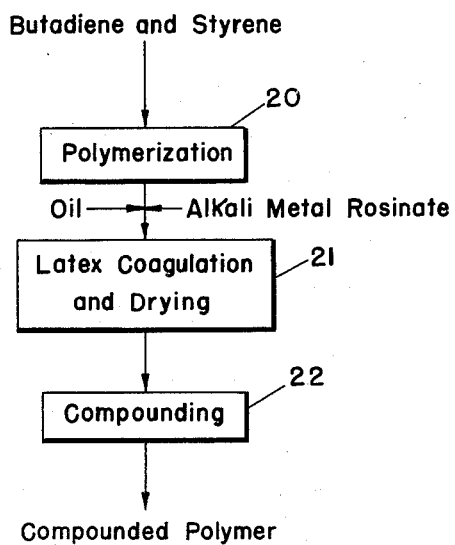
Figure 3:
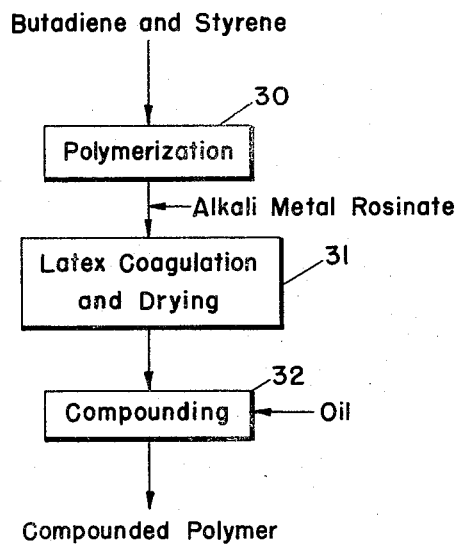

The compositions according to the invention can be prepared in a variety of ways, as indicated schematically in the attached drawing which illustrates the invention. FIGURE 1 illustrates compounding together coagulated rosin-extended polymer and coagulated oil-extended polymer. FIGURE 2 illustrates coagulating in the presence of both oil and rosin. FIGURE 3 illustrates coagulating in the presence of rosin and adding oil during the subsequent compounding.

In FIGURE 1, a process is illustrated wherein butadiene and styrene are interpolymerized in zone 10 by known means to obtain a latex containing a polymer having raw Mooney viscosity of at least 110. One portion of the latex is admixed with an alkali metal soap of rosin acids, e.g. in amount to provide 25 parts by weight of rosin acids per 100 parts of polymer and the mixture introduced into coagulation zone 11 wherein the latex is coagulated by known means, e.g. the conventional salt-acid technique. Alternatively, large amounts of rosin soap could be used in the polymerization step in order to obtain the required amounts of rosin in the polymer upon coagulation without adding rosin after the polymerization. Another portion of the latex is admixed with mineral oil, e.g. in the form of an emulsion in water, the amount of oil being for example 25 parts by weight of oil per 100 parts of polymer, and the mixture is introduced into coagulation zone 12 wherein the latex is coagulated by known means, e.g. the conventional salt-acid technique. The polymers obtained, after conventional washing and drying, are both introduced into compounding zone 13 wherein they are compounded with other compounding ingredients; 40 parts by weight of the rosin-extended polymer and 60 parts by weight of oil-extended polymer are employed for example in the compounding step. Additional oil or rosin or both may be added during the compounding.

In the process of FIGURE 2, butadiene and styrene are interpolymerized in zone 20 to obtain a latex containing a polymer having raw Mooney viscosity of at least 110. Petroleum oil and alkali metal rosinate are added, together or separately, to the latex, the ratio of alkali metal rosinate to oil being at least 10 parts by weight of alkali metal rosinate per 100 parts by weight of oil. The resulting mixture is introduced into coagulation zone 21 and the latex coagulated by known means. The coagulated polymer obtained is then compounded with other ingredients in zone 22; oil or rosin or both may be added during the compounding.

In the process of FIGURE 3, butadiene and styrene are interpolymerized in zone 30 to obtain a latex containing a polymer having raw Mooney viscosity of at least 110. Alkali metal rosinate is added to the latex and the mixture is introduced into coagulation zone 31 and the latex coagulated therein by known means. The polymer obtained is introduced into zone 32 and compounded therein with petroleum oil and other compounding ingredients; rosin may be added during the compounding.

Alternatively to the process of FIGURE 3, petroleum oil may be added to the latex prior to coagulation and rosin added after coagulation. Other means of obtaining oil-rosin extended polymers according to the invention may be employed.

The petroleum oil employed according to the invention preferably has S.U. viscosity at 100° F. of at least about 100 seconds. More preferred viscosities are those in the range from 1500 to 5000 seconds at 100° F., since the lower molecular weight oils tend to be too volatile for completely satisfactory results in the polymer-drying and compounding stages, and the higher molecular weight oils often provide superior properties in the compounded rubber and vulcanizate. Naphthenic-base oils are particularly advantageous for use according to the invention.

The following examples illustrate the invention:

*Example I*

A compounded polymer was prepared according to the general scheme shown in FIGURE 1. The compounded polymer had the following approximate composition:

| | Parts by weight |
|---|---|
| Oil-extended GR–S: | |
|   Polymer (ML-4 at least 110) | 57.5 |
|   Petroleum oil | 14.4 |
|   Rosin | 1.55 |
|   Fatty acid | 1.55 |
| Rosin-extended GR–S: | |
|   Polymer (ML-4 at least 110) | 40 |
|   Rosin, disproportionated | 10 |
| HAF black ("Statex R") | 52.5 |
| Zinc oxide | 3.8 |
| Stearic acid | 2.5 |
| Sulfur | 2 |
| N-cyclohexyl-2-benzothiazyl sulfonamide ("Santocure") | 1.7 |

The presence of rosin and fatty acid in the oil-extended polymer is due to the fact that a mixed rosin and fatty soap emulsifier was used in the preparation of the polymer. The ratio of rosin to oil in the composition is 11.55 parts per 14.4 parts, or about 80 parts of rosin per 100 parts of oil, and the ratio of rosin plus oil to polymer in the composition is 25.95 parts per 97.5 parts, or about 27 parts of rosin plus oil per 100 parts of polymer.

The above oil-rosin extended polymer composition was cured at 292° F. for 32 minutes to obtain a cured polymer having the following properties:

| | |
|---|---|
| Tensile strength p.s.i. | 3640 |
| 300% modulus p.s.i. | 1510 |
| 500% modulus p.s.i. | 3020 |
| Elongation at break percent | 595 |
| Shore hardness (5 seconds) | 53 |

The processing difficulties which are ordinarily encountered with rosin-extended polymers because of the tacky nature of the latter, and which interfere with the commercial processability thereof, were not encountered in the compounding of the oil-rosin extended polymer composition.

This example shows that an oil-rosin extended polymer containing about 80 parts of rosin per 100 parts of oil and about 27 parts of rosin plus oil per 100 parts of polymer is commercially processable, and has highly satisfactory tensile strength, modulus, elongation, and hardness properties.

*Example II*

A compounded polymer was prepared according to the general scheme shown in FIGURE 1, with some additional oil added during compounding. The compounded polymer had the following approximate composition:

| | Parts by weight |
|---|---|
| Oil-extended GR–S: | |
|   Polymer (ML-4 at least 110) | 46.2 |
|   Petroleum oil | 11.5 |
|   Rosin | 1.15 |
|   Fatty acid | 1.15 |
| Rosin-extended GR–S: | |
|   Polymer (ML-4 at least 110) | 32 |
|   Rosin, disproportionated | 8 |
| HAF black ("Statex R") | 50 |
| Zinc oxide | 3 |
| Stearic acid | 1.5 |
| Petroleum oil | 4 |
| Sulfur | 2 |
| N-cyclohexyl-2-benzothiazyl sulfonamide ("Santocure") | 1.5 |

The ratio of rosin to oil in the compound is 9.15 parts per 15.5 parts, or about 59 parts of rosin per 100 parts of oil, and the ratio of rosin plus oil to polymer in the compound is 24.65 parts per 78.2 parts, or about 31.5 parts of rosin plus oil per 100 parts of polymer.

The above oil-rosin extended rubber composition was compared with the following oil-extended rubber composition:

| | Parts by weight |
|---|---|
| Oil-extended GR–S: | |
|   Polymer (ML-4 at least 110) | 76.9 |
|   Petroleum oil | 19.2 |
|   Rosin | 1.95 |
|   Fatty acid | 1.95 |
| HAF black ("Statex R") | 50 |
| Zinc oxide | 3 |
| Stearic acid | 1.5 |
| Petroleum oil | 4 |
| Sulfur | 2 |
| N-cyclohexyl-2-benzothiazyl sulfonamide ("Santocure") | 1.1 |

The ratio of rosin to oil is 1.95 parts per 23.2 parts, or about 8.4 parts per 100, and the ratio of rosin plus oil to polymer is 25.15 parts per 76.9 parts, or about 32.7 parts per 100.

The above oil-rosin extended polymer composition and oil-extended polymer composition were cured at 292° F. to obtain cured polymers having the properties shown in the following table:

| | Oil-Rosin Polymer | | Oil-Extended Polymer— Cured 70 Minutes |
|---|---|---|---|
| | Cured 25 Minutes | Cured 70 Minutes | |
| Tensile strength, p.s.i. | 3,550 | 3,535 | 3,240 |
| 300% modulus, p.s.i. | 1,400 | 2,435 | 2,435 |
| 500% modulus, p.s.i. | 2,830 | | |
| Elongation at break, percent | 615 | 410 | 360 |
| Shore hardness (5 second) | 54 | 59 | 59 |

Other samples were cured at 292° F. and the cured samples tested for A.S.T.M. brittle point. The following table shows the results:

| Polymer: | Brittle point, ° F. |
|---|---|
|   Oil-rosin extended | minus 50 |
|   Oil-extended | minus 50 |

The above data show that the oil-rosin extended polymer, at 70 minutes cure, is superior in tensile strength and elongation to the oil-extended polymer, and that the oil-rosin extended polymer is equivalent in brittle point to the oil-extended polymers.

The oil-rosin extended polymer was essentially equivalent to the oil-extended polymer in ease of processing and compounding, and no substantial difficulty was experienced with the oil-rosin extended polymer because of excessive tackiness.

Example III

A compounded polymer was prepared according to the general scheme shown in FIGURE 1. The compounded polymer had the following approximate composition:

| Oil-extended GR–S: | Parts by weight |
|---|---|
| Polymer (ML–4 at least 110) | 46 |
| Petroleum oil | 11.5 |
| Rosin | 2.5 |
| Rosin-extended GR–S: | |
| Polymer (ML–4 at least 110) | 32 |
| Rosin | 8 |
| HAF black ("Statex R") | 50 |
| Zinc oxide | 3 |
| Stearic acid | 1.5 |
| Petroleum oil | 4 |
| Sulfur | 2 |
| N-cyclohexyl-2-benzothiazyl sulfonamide ("Santocure") | 1.5 |

This composition and the oil-rosin extended composition of Example I differed in the oil used as extender in the oil-extended GR–S. The oil used in the present example had S.U. viscosity at 210° F. of 90 seconds and aniline point of 130° F., whereas the oil used in the composition of Example I had S.U. viscosity at 210° F. of 85 and aniline point of 181° F.

The compounded polymer contained about 68 parts of rosin per 100 parts of oil, and about 33 parts of rosin plus oil per 100 parts of polymer.

The above oil-rosin extended rubber composition was compared with the following oil-extended rubber composition:

| Oil-extended GR–S: | Parts by weight |
|---|---|
| Polymer (ML–4 at least 110) | 76.7 |
| Petroleum oil | 19.2 |
| Rosin | 4.1 |
| HAF black ("Statex R") | 50 |
| Zinc oxide | 3 |
| Stearic acid | 1.5 |
| Petroleum oil | 4 |
| Sulfur | 2 |
| N-cyclohexyl-2-benzothiazyl sulfonamide ("Santocure") | 1.1 |

The oil-extended GR–S used here was the same as that used in the oil-rosin extended composition of this example. The compounded polymer contained about 17.7 parts of rosin per 100 parts of oil, and about 35.6 parts of rosin plus oil per 100 parts of polymer.

The above oil-rosin extended polymer composition and oil-extended polymer composition were cured at 292° F. to obtain cured polymers having the properties shown in the following table:

| | Oil-Rosin Polymer | | Oil-Extended Polymer— Cured 70 Minutes |
|---|---|---|---|
| | Cured 25 Minutes | Cured 70 Minutes | |
| Tensile strength, p.s.i. | 3,460 | 3,610 | 3,330 |
| 300% modulus, p.s.i. | 1,280 | 2,255 | 2,250 |
| 500% modulus, p.s.i. | 2,590 | | |
| Elongation at break, percent | 625 | 420 | 405 |
| Shore hardness (5 second) | 51 | 58 | 59 |
| Rebound, Bashore, percent | | 53 | 51.7 |
| Heat buildup (Goodrich flexometer), ° F. | | 52.5 | 52.5 |

The above data show that the oil-rosin extended polymer of this example, is superior, at 70 minute cure, in tensile strength and elongation to the oil-extended polymer, and that the oil-rosin extended polymer is approximately equivalent, at 70 minute cure, in rebound and heat buildup to the oil-extended polymer.

The invention claimed is:

1. A rubber-like composition having compounded Mooney viscosity within the approximate range from 40 to 80 and comprising: a butadiene polymer having Mooney viscosity of at least 110; a rosin material selected from the group consisting of rosin and rosin derivatives; and a petroleum oil, the ratio of said rosin material to said oil being within the approximate range from 40 to 100 parts by weight per 100 parts of oil, the amount of oil and rosin material being sufficient to produce said compounded Mooney viscosity.

2. Method for preparing rubber-like compositions which comprises: coagulating, in the presence of added rosin material selected from the group consisting of rosin and rosin derivatives, a first portion of a latex comprising a rubber-like butadiene polymer having Mooney viscosity of at least 110; coagulating a second portion of such latex in the presence of added petroleum oil; and blending the coagulated polymer from said first portion with the coagulated polymer from said second portion to obtain a compounded polymer containing not more than 100 parts by weight of rosin material per 100 parts of oil, the amount of oil and rosin material being sufficient to produce Mooney viscosity of said compounded polymer within the approximate range from 40 to 80.

3. Method for preparing rubber-like compositions which comprises: coagulating, in the presence of added rosin material selected from the group consisting of rosin and rosin derivatives and in the presence of added petroleum oil, a latex comprising a rubber-like butadiene polymer having Mooney viscosity of at least 110, the ratio of said added rosin material to said added petroleum oil being at least 10 parts by weight per 100 parts of oil; and compounding the coagulated polymer to obtain a compounded polymer containing not more than 100 parts by weight of rosin material per 100 parts of oil, the amount of oil and rosin material being sufficient to produce Mooney viscosity of said compounded polymer within the approximate range from 40 to 80.

4. Method for preparing rubber-like compositions which comprises: coagulating, in the presence of added rosin material selected from the group consisting of rosin and rosin derivatives, a latex comprising a rubber-like butadiene polymer having Mooney viscosity of at least 110; and compounding the coagulated polymer with added petroleum oil to obtain a compounded polymer containing not more than 100 parts by weight of rosin material per 100 parts of oil, the amount of oil and rosin material being sufficient to produce Mooney viscosity of said compounded polymer within the approximate range from 40 to 80.

5. Method for preparing rubber-like compositions which comprises: coagulating, in the presence of added petroleum oil, a latex comprising a rubber-like butadiene polymer having Mooney viscosity of at least 110; and compounding the coagulated polymer with added rosin material selected from the group consisting of rosin and rosin derivatives to obtain a compounded polymer containing not more than 100 parts by weight of rosin material per 100 parts of oil, the amount of oil and rosin material being sufficient to produce Mooney viscosity of said compounded polymer within the approximate range from 40 to 80.

6. Method for preparing rubber-like compositions which comprises: coagulating a latex comprising a butadiene polymer having Mooney viscosity of at least 110 in the presence of an extender selected from the group consisting of (1) a rosin material selected from the group consisting of rosin and rosin derivatives, (2) a petroleum oil and (3) a mixture of said rosin material and said oil; and compounding the coagulated polymer to obtain a compounded polymer containing from 40 to 100 parts by weight of rosin material per 100 parts of oil and having compounded Mooney viscosity within the approximate range from 40 to 80, the amount of oil and rosin material being sufficient to produce said compounded Mooney viscosity.

7. A cured synthetic rubber composition suitable for use as tire stock and obtained by curing a compounded polymer having compounded Mooney viscosity within the approximate range from 40 to 80, said compounded polymer comprising (1) a butadiene-styrene interpolymer having raw Mooney viscosity of at least 110, (2) a rosin material selected from the group consisting of rosin and rosin derivatives, and (3) a petroleum oil, the ratio of rosin material to oil being within the approximate range from 40 to 100 parts by weight per 100 parts of oil, said composition having tensile strength of at least about 3,460 p.s.i. and greater than that of a similar composition containing additional petroleum oil in place of said rosin material, and having brittle point approximately the same as that of said similar composition, the amount of oil and rosin material being sufficient to produce said compounded Mooney viscosity.

8. Composition according to claim 1 wherein said polymer is a butadaiene-styrene interpolymer, and wherein the weight ratio of the sum of the amounts of rosin material and oil to the amount of interpolymer is within the approximate range from 25:100 to 75:100.

9. Composition according to claim 1 wherein said ratio is about 80 parts per 100 parts, and wherein the ratio of the sum of the amounts of rosin material and of oil to the amount of polymer is about 27 parts by weight per 100 parts of polymer.

10. Composition according to claim 1 wherein said ratio is about 59 parts per 100 parts, and wherein the ratio of the sum of the amounts of rosin material and of oil to the amount of polymer is about 31.5 parts by weight per 100 parts of polymer.

11. Composition according to claim 1 wherein said ratio is about 68 parts per 100 parts, and wherein the ratio of the sum of the amounts of rosin material and of oil to the amount of polymer is about 33 parts by weight per 100 parts of polymer.

12. Composition according to claim 1 and containing 54 to 64 parts by weight of carbon black per 100 parts of said polymer.

References Cited in the file of this patent

UNITED STATES PATENTS

| | | |
|---|---|---|
| 2,487,060 | Pike et al. | Nov. 8, 1949 |
| 2,551,600 | Holland et al. | May 8, 1951 |
| 2,576,968 | Pike et al. | Dec. 4, 1951 |
| 2,713,572 | Hall | July 19, 1955 |
| 2,875,170 | Ayers et al. | Feb. 24, 1959 |

FOREIGN PATENTS

| | | |
|---|---|---|
| 152,872 | Australia | Aug. 18, 1953 |

OTHER REFERENCES

Amberg: Rubber Age, pages 191–9 (May 1951).

Howland et al.: Ind. & Eng. Chem., pages 1053–9, volume 45, No. 5 (May 1953).